United States Patent
Ridgway

(10) Patent No.: US 7,123,793 B2
(45) Date of Patent: Oct. 17, 2006

(54) MODULATOR ARRAY ARCHITECTURES

(75) Inventor: Richard W. Ridgway, Westerville, OH (US)

(73) Assignee: Optimer Photonics, Inc., Columbus, OH (US)

(*) Notice: Subject to any disclaimer, the term of this patent is extended or adjusted under 35 U.S.C. 154(b) by 106 days.

(21) Appl. No.: 10/935,481

(22) Filed: Sep. 7, 2004

(65) Prior Publication Data

US 2005/0053324 A1 Mar. 10, 2005

Related U.S. Application Data

(60) Provisional application No. 60/547,004, filed on Feb. 23, 2004, provisional application No. 60/501,460, filed on Sep. 9, 2003.

(51) Int. Cl.
 *G02B 6/34* (2006.01)
 *G02B 6/26* (2006.01)
 *G02B 6/42* (2006.01)
 *G02F 1/295* (2006.01)
 *H04J 14/00* (2006.01)
 *H04J 14/02* (2006.01)

(52) U.S. Cl. .............. 385/37; 385/4; 385/9; 385/10; 385/15; 385/31; 398/43; 398/79; 398/82; 398/83; 398/84

(58) Field of Classification Search .......... 385/37, 385/4, 9, 10, 15, 31; 398/43, 79, 82–84
See application file for complete search history.

(56) References Cited

U.S. PATENT DOCUMENTS

| | | | |
|---|---|---|---|
| 4,642,804 A | 2/1987 | Personick et al. | |
| 5,221,983 A | 6/1993 | Wagner et al. | |
| 5,542,014 A * | 7/1996 | Lerminiaux et al. | 385/45 |
| 6,067,387 A * | 5/2000 | Oh et al. | 385/2 |
| 6,128,422 A * | 10/2000 | Hodgson | 385/11 |
| 6,396,605 B1 * | 5/2002 | Heflinger et al. | 398/140 |
| 6,542,267 B1 * | 4/2003 | Nicholson | 398/59 |
| 6,567,429 B1 * | 5/2003 | DeMartino | 370/539 |
| 6,687,425 B1 | 2/2004 | Ridgway et al. | |
| 6,782,149 B1 | 8/2004 | Ridgway et al. | |
| 6,795,597 B1 | 9/2004 | Ridgway et al. | |
| 2001/0050803 A1 * | 12/2001 | Choi et al. | 359/341.1 |
| 2003/0103759 A1 * | 6/2003 | Zappettini et al. | 385/142 |
| 2003/0165173 A1 * | 9/2003 | Helbing et al. | 372/50 |
| 2004/0008916 A1 | 1/2004 | Ridgway et al. | |
| 2004/0096137 A1 | 5/2004 | Risser et al. | |

(Continued)

FOREIGN PATENT DOCUMENTS

EP 1 341 333 A 9/2003

*Primary Examiner*—Brian Healy
*Assistant Examiner*—Jerry Martin Blevins
(74) *Attorney, Agent, or Firm*—Dinsmore & Shohl LLP

(57) ABSTRACT

An optical architecture is provided comprising at least one broadband light source, a mod/mux unit, and a plurality of premises stations in communication with the mod/mux unit via an optical distribution hub. The mod/mux unit is configured to permit selective modulation of demultiplexed components of a target wavelength band of an optical signal, multiplex the selectively modulated optical signal, and direct the target wavelength band and a bypass wavelength band of the multiplexed optical signal to the optical distribution hub. The optical distribution hub comprises an arrayed waveguide grating configured to demultiplex the multiplexed optical signal and distribute respective distinct wavelength portions of the target wavelength band and respective distinct wavelength portions of the bypass wavelength band to respective ones of the premises stations.

40 Claims, 4 Drawing Sheets

U.S. PATENT DOCUMENTS

2004/0131303 A1 7/2004 Nippa et al.
2004/0184694 A1 9/2004 Ridgway et al.
2004/0218924 A1* 11/2004 Fathallah .................... 398/77

* cited by examiner

MODULATOR ARRAY ARCHITECTURES

CROSS-REFERENCE TO RELATED APPLICATIONS

This application claims the benefit of U.S. Provisional Application Ser. No. 60/501,460, filed Sep. 9, 2003 (OPI 0009 MA), and 60/547,004, filed Feb. 23, 2004 (OPI 0013 MA).

BACKGROUND OF THE INVENTION

The present invention relates to optical data transfer system architectures and, more particularly, to Fiber-to-the-Premises (FTTP) architectures and components for use therein. There is a continuing drive in the industry to provide improvements to the hardware and methodology utilized for the delivery and receipt of data in a telecommunications and other types of data transfer networks.

Optical data transfer networks operate according to the general principle that information can be generated, shared, passed on, bypassed or otherwise manipulated or communicated within a network of data transfer lines. Network applications include LANs, MANs, WANs, SANs, intra-building and interbuilding communications, broadcast distribution, intelligent transportation systems (ITS), telecommunications, supervisory control and data acquisition (SCADA) networks, etc. It has been recognized that optical fiber data transfer lines embody a number of advantages over electrically conductive data transfer lines. Specifically, optical lines offer increased bandwidth, enhanced durability, easier installation, improved immunity to electromagnetic interference, and resistance to harsh environmental conditions. Accordingly, the present invention is directed at providing improved optical architectures for data transfer and, more particularly, to improved schemes for effectuating the transfer of data to and from homes, businesses, and other remote premises.

BRIEF SUMMARY OF THE INVENTION

In accordance with one embodiment of the present invention, an optical architecture is provided comprising first and second arrayed waveguide gratings, a modulator array, and a plurality of optical waveguides. The optical waveguides are configured to define an optical input and an optical output. The first arrayed waveguide grating is configured to demultiplex an optical signal propagating in a downstream direction from the optical input to the first arrayed waveguide grating. The modulator array is configured to permit selective modulation of demultiplexed components of the optical signal propagating in the downstream direction from the first arrayed waveguide grating. The second arrayed waveguide grating is configured to multiplex the demultiplexed and selectively modulated optical signal propagating in the downstream direction from the modulator array and direct the multiplexed optical signal to the optical output.

In accordance with another embodiment of the present invention, an optical architecture is provided comprising at least one broadband light source, a mod/mux unit, and a plurality of premises stations in communication with the mod/mux unit via an optical distribution hub. The broadband light source is configured to generate a target wavelength band and a bypass wavelength band of an optical signal. The mod/mux unit is configured to permit selective modulation of demultiplexed components of the target wavelength band of the optical signal, multiplex the selectively modulated optical signal, and direct the target wavelength band and the bypass wavelength band of the multiplexed optical signal to the optical distribution hub. The optical distribution hub comprises an arrayed waveguide grating configured to demultiplex the multiplexed optical signal and distribute respective distinct wavelength portions of the target wavelength band and respective distinct wavelength portions of the bypass wavelength band to respective ones of the premises stations.

In accordance with another embodiment of the present invention, respective ones of the premises stations are configured to detect a portion of a target wavelength band of the optical signal and modulate a portion of a bypass wavelength band of the optical signal. The premises stations can be further configured to return a selectively modulated portion of the bypass wavelength band to the optical distribution hub, which may in turn be configured to multiplex a plurality of selectively modulated portions of the bypass wavelength band returned from the premises stations and direct the multiplexed portions of the bypass wavelength band to the second arrayed waveguide grating.

Accordingly, it is an object of the present invention to provide improved optical architectures for data transfer, particularly data transfer to and from homes, businesses, and other remote premises. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
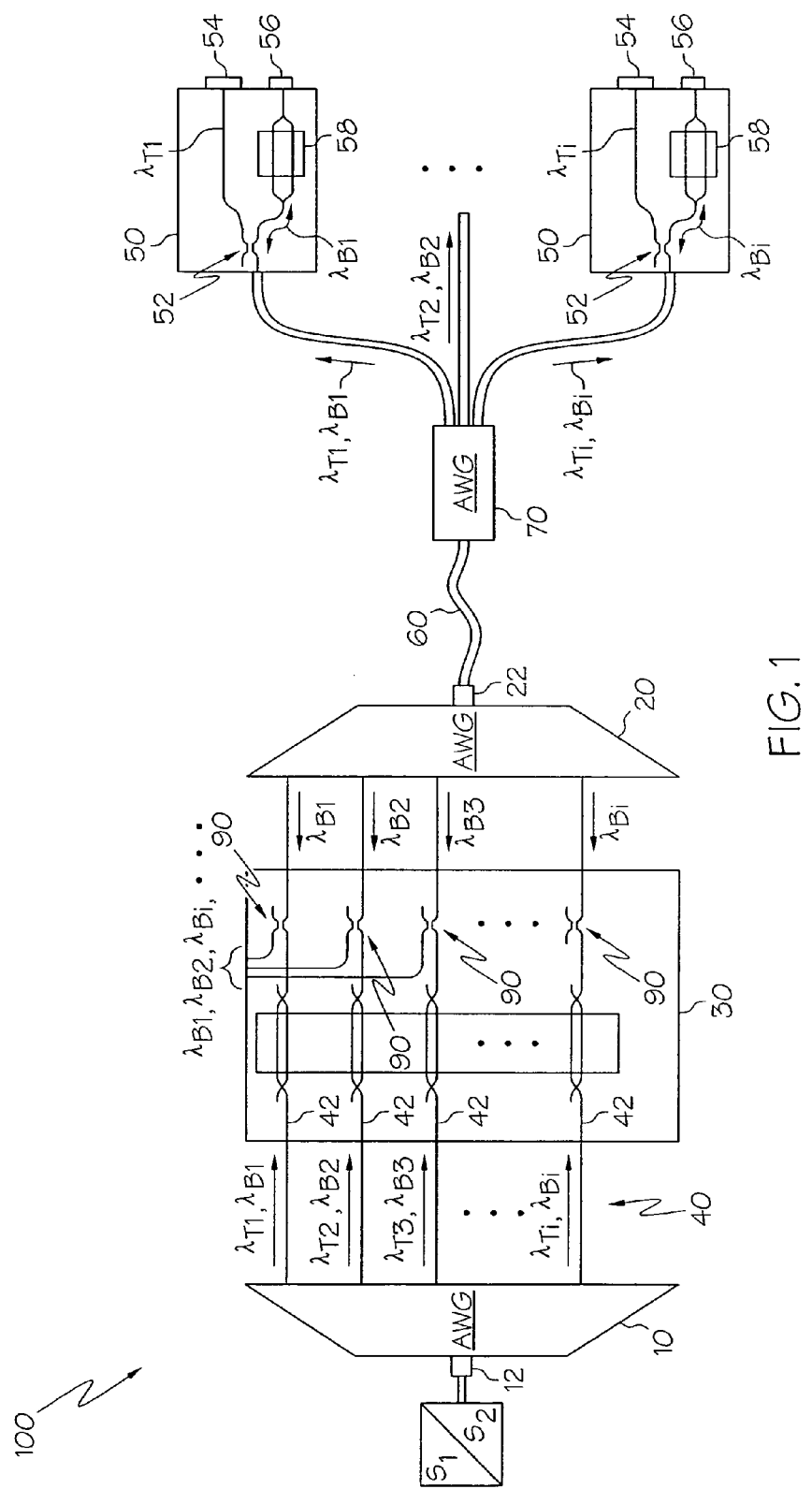
FIG. 1 is a schematic illustration of an optical data transfer system architecture according to one embodiment of the present invention.
Figure 2:
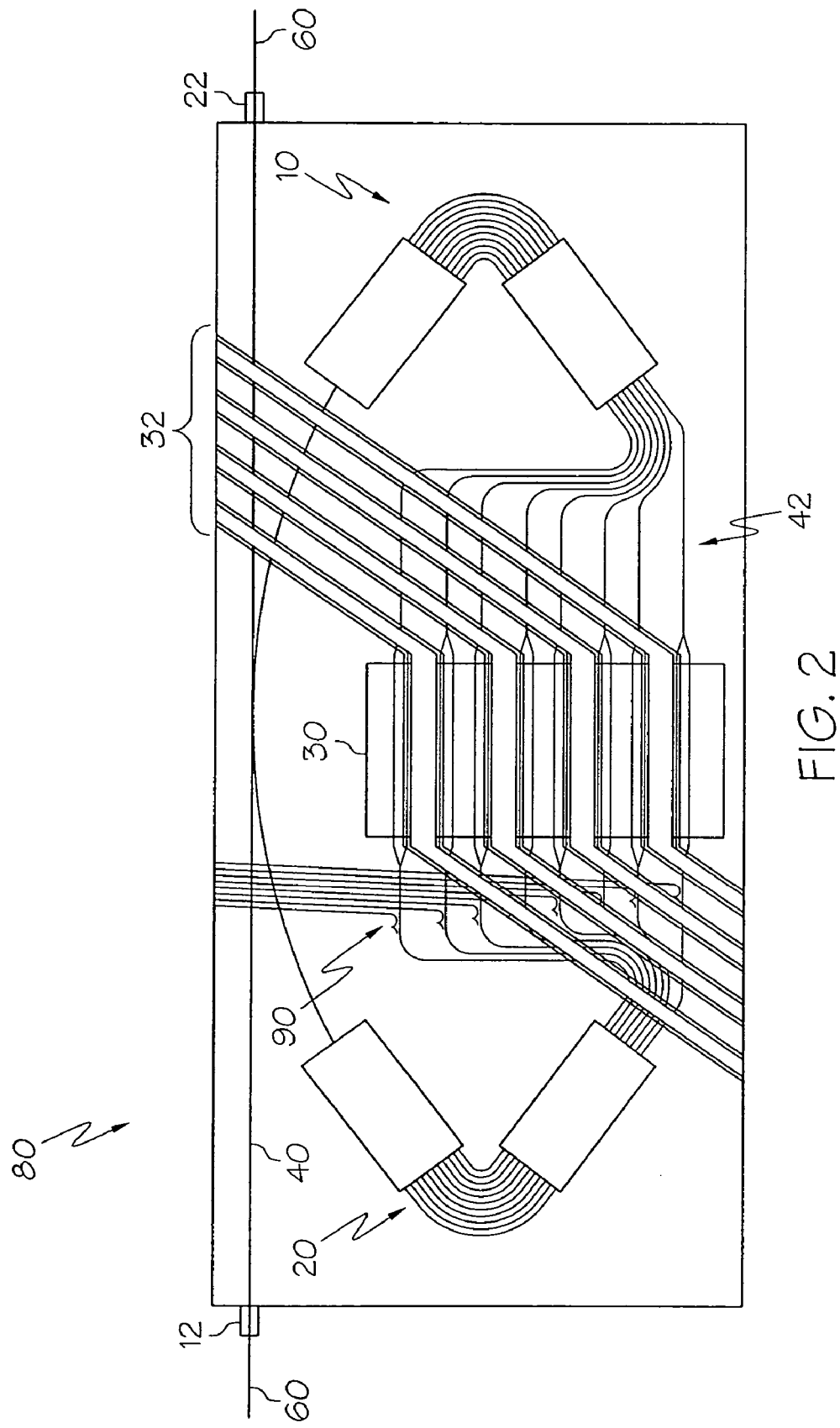
FIG. 2 is a schematic illustration of a planar lightwave circuit according to one embodiment of the present invention.

Referring initially to FIG. 1, an optical architecture 100 according to one embodiment of the present invention is illustrated. Generally, the optical architecture 100 comprises first and second arrayed waveguide gratings 10, 20, a modulator array 30, a plurality of optical waveguides 40, a plurality of premises stations 50 in communication with the remaining system architecture via fiber optic transmission lines 60 and an optical distribution hub 70. As is illustrated in FIG. 2, where like components are illustrated with like reference numerals, the first and second arrayed waveguide gratings 10, 20, the modulator array 30, and the associated network of waveguides 40 may be arranged as a stand-alone mod/mux unit 80 defining an optical input 12 and an optical output 22.

The first arrayed waveguide grating 10 is configured to demultiplex an optical signal propagating in a downstream direction from the optical input 12. The optical architecture 100 may comprise one or more broadband light sources $S_1$, $S_2$ coupled to the optical input 12. In this manner, the first arrayed waveguide grating 10 can demultiplex the optical signal from each light source $S_1$, $S_2$ into a plurality of signals of distinct wavelengths. For the purposes of defining and describing the present invention, it is noted that a broadband light source is characterized by a spectral width sufficient to permit wavelength division of the optical signal into a plurality of distinct and separately usable component signals characterized by different optical wavelengths. In this manner, distinct wavelength portions of the optical signal may be carried along respective branches of the waveguide network and may be subject to independent modulation, as is described below with reference to the modulator array 30.

Figure 3:
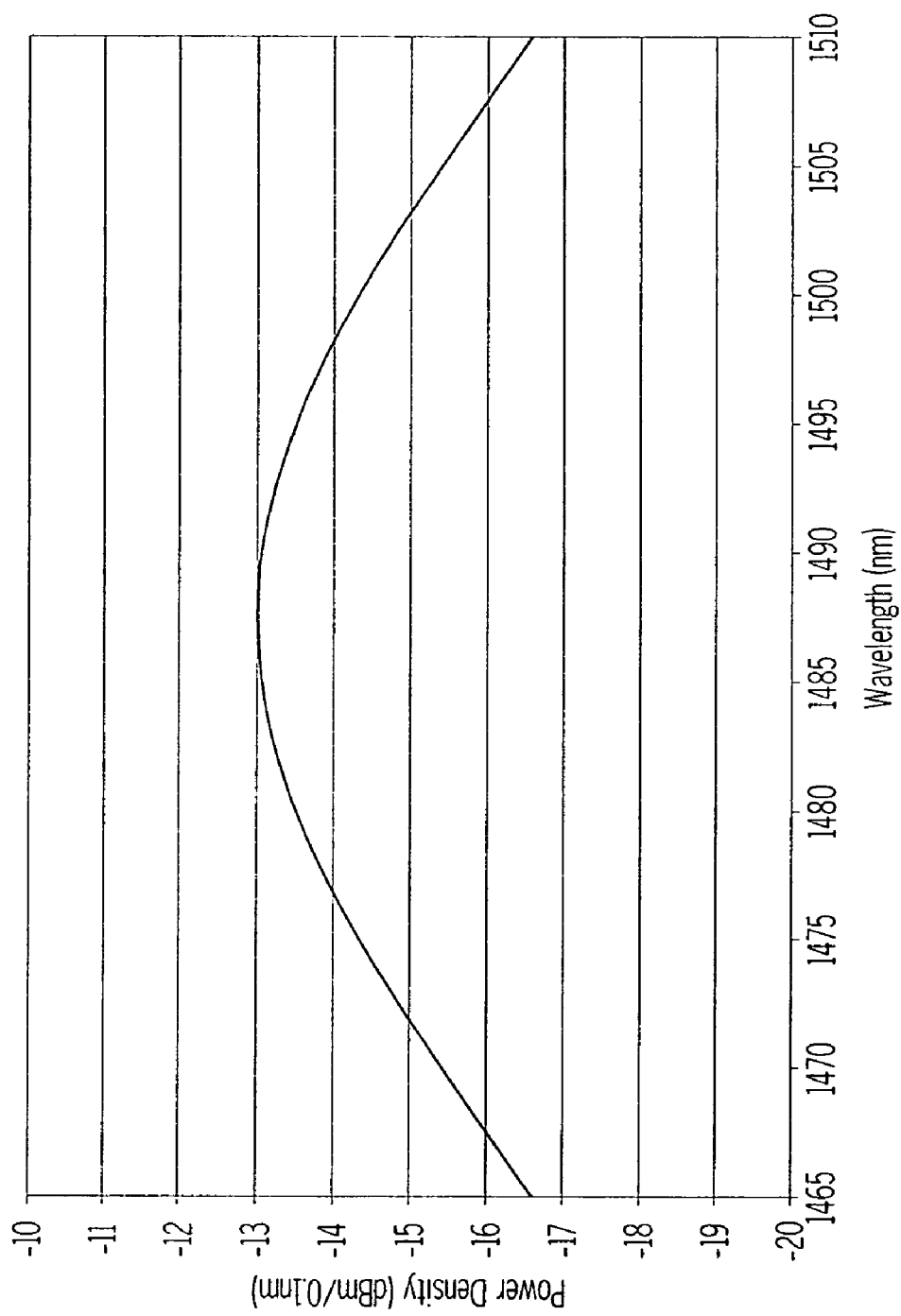
FIG. 3 is a graphical illustration of a broadband light source according to one embodiment of the present invention.

Referring to FIG. 3 by way of example and not by limitation, the broadband light source illustrated therein is characterized by a spectral width of about 40 nm at about 3 dB. Although a variety of suitable spectral widths are contemplated, in many embodiments of the present invention, it may be preferable to ensure that the broadband light source is characterized by a spectral width sufficient to enable the first arrayed waveguide grating to demultiplex the optical signal into a plurality of signals separated from each other by at least about 2 nm. It is noted that a variety of light emitting diodes, e.g., super luminescent light emitting diodes, would be suitable for use as the broadband light source of the present invention, although a variety of suitable broadband light sources exist and are likely to be developed.

Where the optical architecture 100 comprises a pair of broadband light sources $S_1$, $S_2$ characterized by two distinct wavelength bands or a single broadband light source configured to define two distinct wavelength bands, the first arrayed waveguide grating 10 can be configured for dual band wavelength division multiplexing. Specifically, the arrayed waveguide grating 10 is configured to superimpose respective wavelength-divided portions of each band on individual branches 42 of the waveguide network extending from the first arrayed waveguide grating 10 to the modulator array 30. For example, the pair of broadband light sources $S_1$, $S_2$ can be centered at different wavelengths so as to define a target wavelength band $\lambda_T$ centered at, e.g., 1550 nm, and a bypass wavelength band $\lambda_B$ centered at, e.g., 1310 nm. Alternatively, a single broadband light source can be configured with suitable optical components to define the two distinct wave bands. As a further alternative, a single broadband light source may be utilized where there is not a need for both the target wavelength band XT and the bypass wavelength band $\lambda_B$—in which case there would be little or no need for the below-described output coupler 90 or wavelength selectivity of the various components of the architecture 100.

The modulator array 30 can then be configured to modulate individual wavelength portions $\lambda_{T1}, \lambda_{T2}, \ldots$ of the target wavelength band and pass individual wavelength portions $\lambda_{B1}, \lambda_{B2}, \ldots$ of the bypass wavelength band without substantial modulation. As a result, the various wavelength-divided components of the bypass wavelength band can be preserved for downstream modulation at the premises stations 50 and subsequent return via the hub 70, eliminating the need for independent optical sources at the premises stations 50. The source used for generation of modulated signals from the various premises stations 50 need not be located at the premises stations 50 because the relatively low loss components used throughout the architecture 100 allow for transmission of the bypass band along an optical path of significant length.

The modulator array 30 is configured to permit selective modulation of demultiplexed components of the optical signal propagating in the downstream direction along the individual branches 42 of the waveguide network extending from the first arrayed waveguide grating 10 to the modulator array 30. As is illustrated in FIG. 2, the modulator array 30 comprises an array of Mach Zehnder couplers and electrooptic modulators configured for the wavelength selective splitting and modulation. To this end, a suitable array of control electrodes 32 is illustrated in FIG. 2 although it is contemplated that a variety of suitable control electrode configurations may be utilized in practicing the present invention. Similarly, although a variety of modulator configurations may be practiced in the present invention, it is contemplated that the array of electrooptic modulators may comprise respective waveguide cores and optically functional cladding regions optically coupled to the waveguide cores. The respective cladding regions may define a refractive index that is lower than that of the core and may be configured to vary in response to a control signal applied thereto via the control electrodes 32.

It is contemplated that the optically functional cladding regions may include an electrooptic chromophore and may comprise a Pockels effect medium, a Kerr effect medium, or combinations thereof. In a Pockels effect medium, the functional cladding responds to a voltage control signal via the Pockels Effect—an electrooptic effect in which the application of an electric field produces a birefringence that is linear in the applied field. The Pockels Effect can only occur in anisotropic mediums. For a functional polymeric cladding, this anisotropy needed form the Pockels Effect is typically introduced through electric field poling of the cladding. In contrast, un-poled, substantially isotropic, polymer claddings are the most suitable for use in accordance with many embodiments of the present invention because they cannot exhibit the Pockels Effect, so the dominant electrooptic response results from the Kerr Effect—an electrooptic effect in which the application of an electric field produces a birefringence that varies with a square of the magnitude of the applied field or other control signal.

The core material may also comprise a medium where a control signal applied to the electrode pattern alters the velocity, phase, polarization, amplitude, or other transmission characteristic of light propagating along the waveguide core. It is contemplated that many of the embodiments described herein are also applicable for functional electrooptic waveguide cores with or without functional claddings.

In some particular embodiments of the present invention, it may be preferable to ensure that the optically functional regions of the modulator array 30 comprise a Kerr Effect medium. The Kerr Effect medium can be configured to induce a phase shift $\Delta\phi$ in an optical signal propagating through the optically functional region in response to a suitable control signal. Successive phase shifts $\Delta\phi$ of 180° are induced in the optical signal as a magnitude of the control signal is increased in successive increments. The successive incremental increases in the magnitude of the control voltage decrease in magnitude as the magnitude of the control voltage increases. As a result, relatively small incremental changes in the control voltage can be used to control modulation of the control signal is biased to a sufficiently high value.

The second arrayed waveguide grating 20 is configured to multiplex the demultiplexed and selectively modulated optical signal propagating in the downstream direction from the modulator array 30. The multiplexed optical signal can subsequently be directed to the optical output 12. As is illustrated in FIG. 2, the first and second arrayed waveguide gratings 10, 20, the modulator array 30, and the optical waveguides can be defined on a common substrate of, e.g., silica, silicon, or other like materials, so as to define a planar lightwave circuit (PLC). A variety of suitable waveguide materials are contemplated by the present invention including, but not limited to, silica, silicon, etc. A variety of configurations may also be utilized to form the arrayed waveguide gratings and the functional regions of the modulator array 30. For example, and not by way of limitation, the functional regions may comprise: electrooptically clad silica waveguides; silicon waveguides with electroabsorptive modulators where charge injected into the silicon waveguide makes the waveguide opaque; sol-gel waveguides with electrooptic claddings; lithium niobate waveguides, where the refractive index of the waveguide is dependent upon an applied electric field; and electrooptic polymer waveguides. It is contemplated that electrooptic polymers and other suitable waveguide materials may be utilized throughout the optical architecture 100 of the present invention.

Referring once more to the optical distribution hub 70 and premises stations 50 of FIG. 1, it is noted that the optical distribution hub 70 preferably utilizes a relatively low loss arrayed waveguide grating for demultiplexing the multiplexed optical signal emanating from the optical output 22. The grating of the distribution hub 70 is further configured to distribute distinct wavelength portions of the signal to respective ones of the premises stations 50. In the dual band embodiment described herein, the arrayed waveguide grating of the optical distribution hub 70 is configured such that distinct wavelength portions $\lambda_{T1}$, $\lambda_{T2}$, ... of the target wavelength band and distinct wavelength portions $\lambda_{B1}$, $\lambda_{B2}$, ... of the bypass wavelength band are distributed to respective ones of the premises stations 50.

Each premises station 50 is configured to detect a portion $\lambda_{Ti}$ of the target wavelength band $\lambda_T$ via a suitable wavelength selective coupler 52 and detector 54. Further, each premises station 50 is also equipped with a signal reflector 56 and modulator 58 configured to selectively modulate a portion $\lambda_{Bi}$ of the bypass wavelength band $\lambda_B$ and return the selectively modulated portion of the bypass wavelength band $\lambda_B$ to the optical distribution hub 70. The hub 70, in turn, is configured to multiplex the plurality of selectively modulated portions $\lambda_{B1}$, $\lambda_{B2}$, $\lambda_{Bi}$ ... of the bypass wavelength band returned from the premises stations 50 and direct the multiplexed portions of the bypass wavelength band λB to the second arrayed waveguide grating 20 in the upstream direction. The specific structures of the coupler 52, detector 54, signal reflector 56, and modulator 58 are beyond the scope of the present invention and may be gleaned from existing or subsequently developed teachings in the art of low loss optical transmission.

The second arrayed waveguide grating 20, which is described above as a multiplexer for downstream signals is also configured to demultiplex upstream signals into selectively modulated portions $\lambda_{B1}$, $\lambda_{B2}$, $\lambda_{Bi}$ ... of the bypass wavelength band $\lambda_B$ returned from the premises stations 50. The selectively modulated demultiplexed portions $\lambda_{B1}$, $\lambda_{B2}$, $\lambda_{Bi}$ ... of the bypass wavelength band $\lambda_B$ returned from the premises stations 50 are then directed to respective upstream signal outputs via respective wavelength selective output couplers 90. The output couplers 90 may be provided as 50/50 optical splitters or another suitable device capable of coupling light in both the downstream and upstream directions. Specifically, in the case of a 50/50 optical splitter, a selectively modulated optical signal traveling downstream towards the second arrayed waveguide grating 20 is split such that 50% of the signal reaches the second arrayed waveguide grating 20 and 50% of the signal is lost. On return from the premises 50 via the hub 70, 50% of the signal is directed towards the output as signals $\lambda_{B1}$, $\lambda_{B2}$, $\lambda_{Bi}$ ... while the remaining 50% of the signal is lost in the system. As such, the architecture 100 of the present invention provides for the selective modulation of and transmission of input signals in a target wavelength band to the premises stations 50 and for the return of selectively modulated signals in a bypass wavelength band, eliminating the need for separate optical sources at the premises stations 50. It should be appreciated that there would be little need for the output couplers 90 where only a single wavelength band is passed on to the premises stations 50 or where the bypass wavelength band is not returned to the architecture 100 via the second arrayed waveguide grating 20.

Figure 4A:
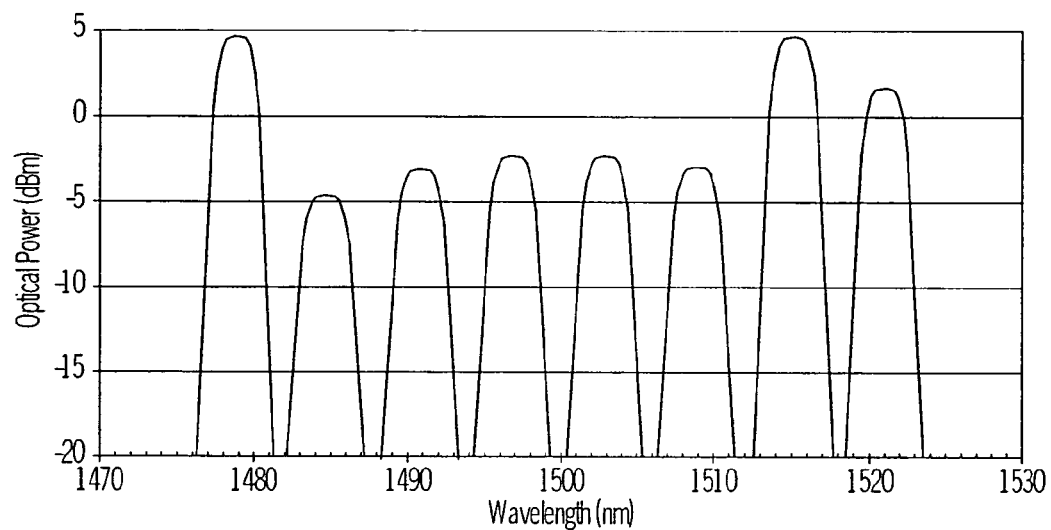
FIGS. 4A and 4B are graphical representations of the operation of a gain equalizer according to one embodiment of the present invention.
Figure 4B:
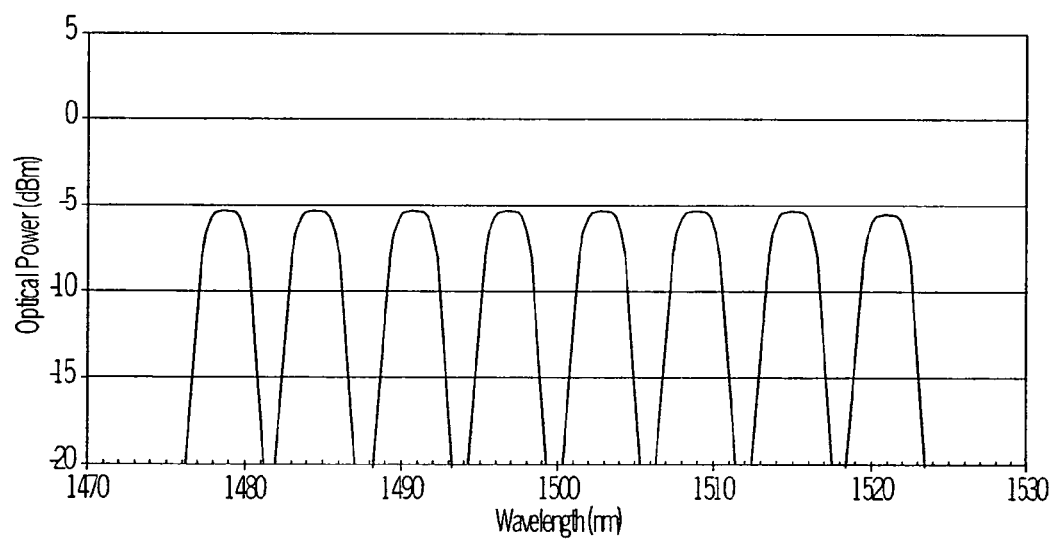

Referring finally to FIGS. 4A and 4B, it is noted that the Mod/Mux unit 80 of FIG. 2 may also be utilized as a gain equalizer if each modulation channel of the modulator array 30 is operated as a variable optical attenuator. Specifically, as will be appreciated by those familiar with waveguide devices utilizing Mach-Zehnder interferometer configurations, thermooptic, electrooptic, or other similar effects can be employed to alter the output power of the various channels of the array 30 through variation of the refractive index of one or both of a pair of waveguide arms forming the interferometer. As a result, the device according to the present invention may be employed to level the power of the respective wavelength-divided optical signals across the array 30.

For example, viewing the Mod/Mux unit 80 of FIG. 2 as an eight channel gain equalizer, FIG. 4A represents the variation in the respective power levels of each input signal across the respective wavelength separated inputs of the array 30. By operating each channel of the array 30 as an independent variable optical attenuator to apply a variable amount of attenuation to the optical signal in the channel, the respective outputs of the signals in each channel of the array 30 may be normalized, as is illustrated in FIG. 4B. Where the Mod/Mux unit 80 of FIG. 2 is operated as an eight channel gain equalizer, it may be preferable to address polarization dependent loss in the variable optical attenuator structure in the manner taught in U.S. Pat. Pub. No. 2002/0008916 A1, the disclosure of which is incorporated herein by reference.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits. For the purposes of defining and describing the present invention, it is noted that a planar lightwave circuit is a device that incorporates a waveguide fabricated in or on a flat material such as, for example, a thin film of silica or silicon.

Although many embodiments of the present invention are illustrated herein with reference to optical signal splitters and combiners in the form of directional coupling regions, it is noted that the present invention contemplates utilization of any suitable conventional or yet to be developed structure for optical signal splitting or combining. For example, suitable alternative structures for splitting and combining optical signals include, but are not limited to, 2×2 directional coupling regions, 1×2 directional coupling regions, 1×2 Y signal splitters and combiners, and 1×2 and 2×2 multimode interference element splitters and combiners. The specific design parameters of these structures are beyond the scope of the present invention and may be gleaned from existing or yet to be developed sources, including U.S. Pat. Pub. No. 2004/0008916 A1, the disclosure of which is incorporated herein by reference.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. Further, it is noted that the term "substantially" is utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An optical architecture comprising first and second arrayed waveguide gratings, a modulator array, a plurality of optical waveguides, and at least one broadband light source, wherein:

said plurality of optical waveguides are configured to define an optical input and an optical output;

said broadband light source is coupled to said optical input and is configured to define a target wavelength band and a bypass wavelength band;

said first arrayed waveguide grating is configured to demultiplex an optical signal propagating in a downstream direction from said optical input to said first arrayed waveguide grating;

said modulator array is configured to modulate wavelengths of said target wavelength band and pass wavelengths of said bypass wavelength band without modulation;

said modulator array is further configured to permit selective modulation of demultiplexed components of said optical signal propagating in said downstream direction from said first arrayed waveguide grating; and said second arrayed waveguide grating is configured to multiplex said demultiplexed and selectively modulated optical signal propagating in said downstream direction from said modulator array and direct said multiplexed optical signal to said optical output.

2. An optical architecture as claimed in claim 1 wherein said broadband light source is characterized by a spectral width of at least about 10 nm at about 3 dB.

3. An optical architecture as claimed in claim 1 wherein said broadband light source is characterized by a spectral width sufficient to enable said first arrayed waveguide grating to demultiplex said optical signal into a plurality of signals separated by at least about 1 nm.

4. An optical architecture as claimed in claim 1 wherein said broadband light source is characterized by a spectral width sufficient to enable said first arrayed waveguide grating to demultiplex said optical signal into at least eight signals of distinct wavelengths.

5. An optical architecture as claimed in claim 1 wherein said broadband source comprises a light emitting diode.

6. An optical architecture as claimed in claim 1 wherein said optical architecture comprises a single broadband light source coupled to said optical input.

7. An optical architecture as claimed in claim 1 wherein said at least one broadband light source comprises a pair of broadband light sources coupled to said optical input.

8. An optical architecture as claimed in claim 7 wherein said pair of broadband light sources are centered at different wavelengths so as to define said target wavelength band and said bypass wavelength band.

9. An optical architecture as claimed in claim 1 wherein said first arrayed waveguide grating is configured for wavelength selective demultiplexing of said optical signal.

10. An optical architecture as claimed in claim 1 wherein said first arrayed waveguide grating is configured for dual band wavelength selective demultiplexing of said optical signal.

11. An optical architecture as claimed in claim 1 wherein said target wavelength band is centered at about 1530 nm and said bypass wavelength band is centered at about 1310 nm.

12. An optical architecture as claimed in claim 1 wherein said modulator array is configured for wavelength selective splitting of said optical signal propagating in said downstream direction from said first arrayed waveguide grating such that a portion of said optical signal in a target wavelength band can be modulated by said modulator array while a portion of said optical signal in a bypass wavelength band is not subject to modulation by said modulator array.

13. An optical architecture as claimed in claim 12 wherein said modulator array comprises an array of Mach Zehnder couplers configured for said wavelength selective splitting.

14. An optical architecture as claimed in claim 1 wherein said modulator array comprises an array of electrooptic modulators.

15. An optical architecture as claimed in claim 14 wherein:

said array of electrooptic modulators comprise respective waveguide cores and claddings optically coupled to said waveguide cores;

said respective claddings comprise respective optically functional regions defining a refractive index that is configured to vary in response to a control signal applied to said optically functional regions;

said refractive index of said optically functional regions is lower than a refractive index of said waveguide cores at an operational wavelength and temperature of operation of said device; and said variation of said refractive index under application of said control signal is dominated by an electrooptic response resulting from the Kerr Effect.

16. An optical architecture as claimed in claim 15 wherein said Kerr Effect medium is configured to induce a phase shift in an optical signal propagating through said optically functional region in response to a control signal, wherein successive phase shifts of 180° are induced in said optical signal as a magnitude of said control signal is increased in successive increments and said successive increments decrease in magnitude as said magnitude of said control voltage is increased.

17. An optical architecture as claimed in claim 1 wherein said optical architecture further comprises respective output couplers configured to couple upstream optical signals propagating in an upstream direction from said second arrayed waveguide grating to respective upstream signal outputs of said architecture.

18. An optical architecture as claimed in claim 17 wherein said output couplers are further configured for wavelength selective coupling of said upstream optical signals.

19. An optical architecture as claimed in claim 18 wherein said output couplers are configured to couple wavelengths of a bypass wavelength band to said upstream signal outputs.

20. An optical architecture as claimed in claim 1 wherein said first and second arrayed waveguide gratings, said modulator array, and said plurality of optical waveguides are defined on a common substrate.

21. An optical architecture as claimed in claim 20 wherein said common substrate, said first and second arrayed waveguide gratings, said modulator array, and said plurality of optical waveguides define a planar lightwave circuit.

22. An optical architecture as claimed in claim 21 wherein said common substrate comprises silica or silicon.

23. An optical architecture as claimed in claim 1 wherein said architecture further comprises a plurality of premises stations in communication with said second arrayed waveguide grating via an optical distribution hub.

24. An optical architecture as claimed in claim 23 wherein said optical distribution hub comprises an arrayed waveguide grating configured to demultiplex said multiplexed optical signal and distribute distinct wavelength portions of said signal to respective ones of said premises stations.

25. An optical architecture as claimed in claim 24 wherein said arrayed waveguide grating of said optical distribution hub is configured such that a distinct wavelength portion of said target wavelength band and a distinct wavelength portion of said bypass wavelength band are distributed to respective ones of said premises stations.

26. An optical architecture as claimed in claim 23 wherein respective ones of said premises stations are configured to detect a portion of a target wavelength band of said optical signal and modulate a portion of a bypass wavelength band of said optical signal.

27. An optical architecture as claimed in claim 26 wherein said premises stations are further configured to return a selectively modulated portion of said bypass wavelength band to said optical distribution hub.

28. An optical architecture as claimed in claim 27 wherein said optical distribution hub is configured to multiplex a plurality of selectively modulated portions of said bypass wavelength band returned from said premises stations and direct said multiplexed portions of said bypass wavelength band to said second arrayed waveguide grating.

29. An optical architecture as claimed in claim 28 wherein said second arrayed waveguide grating is configured to demultiplex and direct said multiplexed portions of said bypass wavelength band returned from said premises stations to respective upstream signal outputs via respective wavelength selective output couplers.

30. An optical architecture as claimed in claim 1 wherein said architecture further comprises:
a plurality of premises stations in communication with said second arrayed waveguide grating via an optical distribution hub and a network of fiber optic transmission lines; and
a pair of broadband light sources coupled to said optical input, said sources centered at different wavelengths so as to define a target wavelength band and a bypass wavelength band.

31. An optical architecture as claimed in claim 1 wherein said optical waveguides comprise doped or undoped silica or silicon waveguides.

32. An optical architecture as claimed in claim 1 wherein said modulator array comprises optically functional regions formed of electrooptically clad silica waveguides, silicon waveguides with electroabsorptive modulators, sol-gel waveguides with electrooptic claddings, lithium niobate waveguides, electrooptic polymer waveguides, and combinations thereof.

33. An optical architecture as claimed in claim 1 wherein said modulator array comprises optically functional regions characterized by electrooptic materials, optically non-linear materials, electroabsorptive materials, and combinations thereof.

34. An optical architecture as claimed in claim 1 wherein said modulator array comprises optically functional regions where the dominant optically functional effect induced in the region is attributable to an electrooptic material, an optically non-linear material, an electroabsorptive material, or combinations thereof.

35. An optical architecture comprising at least one broadband light source, a mod/mux unit, and a plurality of premises stations in communication with said mod/mux unit via an optical distribution hub, wherein:
said broadband light source is configured to generate a target wavelength band of an optical signal and a bypass wavelength band of said optical signal;
said mod/mux unit is configured to permit selective modulation of demultiplexed components of said target wavelength band of said optical signal while passing wavelengths of said bypass wavelength band without modulation, multiplex said selectively modulated optical signal, and direct said target wavelength band and said bypass wavelength band of said multiplexed optical signal to said optical distribution hub; and
said optical distribution hub comprises an arrayed waveguide grating configured to demultiplex said multiplexed optical signal and distribute respective distinct wavelength portions of said target wavelength band and respective distinct wavelength portions of said bypass wavelength band to respective ones of said premises stations.

36. An optical architecture as claimed in claim 35 wherein respective ones of said premises stations are configured to detect a portion of a target wavelength band of said optical signal and modulate a portion of a bypass wavelength band of said optical signal.

37. An optical architecture as claimed in claim 36 wherein said premises stations are further configured to return a selectively modulated portion of said bypass wavelength band to said optical distribution hub.

38. An optical architecture as claimed in claim 37 wherein said optical distribution hub is configured to multiplex a plurality of selectively modulated portions of said bypass wavelength band returned from said premises stations and direct said multiplexed portions of said bypass wavelength band to said mod/mux unit.

39. An optical architecture as claimed in claim 38 wherein said mod/mux unit grating is configured to demultiplex and direct said multiplexed portions of said bypass wavelength band returned from said premises stations to respective upstream signal outputs via respective wavelength selective output couplers.

40. A method of operating an optical architecture comprising first and second arrayed waveguide gratings, a modulator array, and a plurality of optical waveguides, wherein:

said plurality of optical waveguides are configured to define an optical input and an optical output;

said first arrayed waveguide grating is configured to demultiplex an optical signal propagating in a downstream direction from said optical input to said first arrayed waveguide grating;

said modulator array is configured as a gain equalizer to permit selective attenuation of demultiplexed components of said optical signal propagating in said downstream direction from said first arrayed waveguide grating such that respective power levels of said wavelength-divided optical signals across said modulator array can be equalized relative to each another;

said second arrayed waveguide grating is configured to multiplex said demultiplexed, selectively attenuated, and equalized optical signal propagating in said downstream direction from said modulator array and direct said multiplexed optical signal to said optical output; and said method comprises selectively attenuating said demultiplexed components of said optical signal propagating in said downstream direction from said first arrayed waveguide grating such that respective power levels of said wavelength-divided optical signals across said modulator array are equalized relative to each another.

* * * * *

UNITED STATES PATENT AND TRADEMARK OFFICE
CERTIFICATE OF CORRECTION

PATENT NO.         : 7,123,793 B2                                        Page 1 of 1
APPLICATION NO. : 10/935481
DATED                 : October 17, 2006
INVENTOR(S)        : Ridgway It is certified that error appears in the above-identified patent and that said Letters Patent is hereby corrected as shown below:

Col. 3, line 51 "XT" should read --$\lambda_T$--;

Col. 5, line 50 "λB" should read --$\lambda_B$--; and

Col. 11, line 12 "mod/mux unit grating" should read --mod/mux unit--.

Signed and Sealed this

First Day of May, 2007

JON W. DUDAS
*Director of the United States Patent and Trademark Office*